(12) United States Patent
Lin

(10) Patent No.: US 9,351,608 B2
(45) Date of Patent: May 31, 2016

(54) BARBECUE GRILL WITH MULTIFUNCTION

(71) Applicant: Chih Jen Lin, Shenzhen (CN)

(72) Inventor: Chih Jen Lin, Shenzhen (CN)

(73) Assignee: China Window Industry Co., Ltd. (CN)

( * ) Notice: Subject to any disclaimer, the term of this patent is extended or adjusted under 35 U.S.C. 154(b) by 443 days.

(21) Appl. No.: 14/048,311

(22) Filed: Oct. 8, 2013

(65) Prior Publication Data

US 2015/0075515 A1   Mar. 19, 2015

(30) Foreign Application Priority Data

Sep. 18, 2013  (CN) .................. 2013 2 0579092 U

(51) Int. Cl.
*A47J 37/07* (2006.01)

(52) U.S. Cl.
CPC .................. *A47J 37/0713* (2013.01)

(58) Field of Classification Search
USPC .............. 126/25 R, 152, 25 B, 25 A
See application file for complete search history.

(56) References Cited

U.S. PATENT DOCUMENTS

| | | | | |
|---|---|---|---|---|
| 5,546,853 A * | 8/1996 | Heil | .................... | A47J 37/0713 126/25 R |
| 5,839,361 A * | 11/1998 | Richter | ............... | A47J 37/0694 126/25 R |
| 5,878,739 A * | 3/1999 | Guidry | ............... | A47J 37/0704 126/25 A |
| 6,029,566 A * | 2/2000 | McLemore | ......... | A47J 37/0786 126/25 R |
| 6,213,006 B1 * | 4/2001 | Reardon | ............. | A47J 37/0704 126/25 R |
| 6,418,923 B1 * | 7/2002 | Cantrell | ............. | A47J 37/0704 126/25 R |
| 6,474,327 B1 * | 11/2002 | Bossler | ............... | A47B 57/265 126/25 R |
| 8,418,685 B2 * | 4/2013 | Strauch | .................... | A23L 1/01 126/25 A |
| 2002/0189603 A1 * | 12/2002 | Hsu | ..................... | A47J 37/0704 126/25 R |
| 2007/0131234 A1 * | 6/2007 | Moore | ................... | A23B 4/052 131/296 |

* cited by examiner

Primary Examiner — Avinash Savani
(74) Attorney, Agent, or Firm — Garcia-Zamor IP Law; Ruy M. Garcia-Zamor

(57) ABSTRACT

A barbecue grill includes a body, a support and a platform frame. The body is mounted in the support, and the support is erected on the platform frame. The body defines an oven chamber. An oil discharge port is arranged at a bottom of the oven chamber. A plurality of keys are arranged near an opening on the inner sidewall of the oven chamber. A barbecue plate is arranged in the body, and the edge of the barbecue plate rests on the plurality of keys. A burner is arranged in the body, and is located below the barbecue plate. The platform frame includes an oven platform and a stand mounted at the bottom of the oven platform. The support is erected on the oven platform. The oven platform defines a groove for placement of the barbecue plate. A slot is defined on the oven platform to support legs.

9 Claims, 10 Drawing Sheets

BARBECUE GRILL WITH MULTIFUNCTION

CROSS REFERENCE TO RELATED APPLICATION

This application claims priority to Chinese Patent Application CN201320579092.4, filed on Sep. 18, 2013, which is hereby incorporated by reference herein as if fully set forth in its entirety.

TECHNICAL FIELD

The present disclosure generally relates to the technical field of cookers, and especially to a barbecue grill with multifunction.

BACKGROUND

Barbecue may be the most primitive cooking method of human beings and is accomplished in such a manner that air is heated and dried with fuel, and food is placed at a location close to the heat source in the hot dry air and then heated up. In modern society, barbecue method has been diversified due to a variety of fire application ways, and various barbecue ovens, barbecue grills and barbecue sauces have emerged. Barbecue itself has become a leisure entertainment way in people's party or become a business form. Barbecuing alone is quite rare in modern society, and it is typically considered as a group activity for a small family or even a large institution, no matter in Asia, America or Europe. One of the indispensable tools to barbecue is barbecue grill, which is classified in three types: solid fuel-type barbecue grill, gas fuel-type barbecue grill and electric barbecue grill; gas fuel-type barbecue grill and electric barbecue grill enjoy better popularity than solid fuel-type barbecue grill, which is mostly based on the primary fuel-charcoal, because of no oil smoke, no pollution to food and convenient post-barbecue cleaning, in addition, during an outdoor activity with restricted power condition, gas fuel-type barbecue grill is widely used by outdoor barbeque lovers owing to its convenient functions. A range of problems are also found in a gas-type barbecue grill during its use, for example: in the process of barbecue, burners are generally located below a barbecue grill for the purpose of full heat utilization, as a result, oil that drips during barbecuing or food wastes will directly fall onto these burners so as to curtain or even block off burners' air supply holes, thus affecting normal fire supply of the burners; a traditional barbecue grill is only equipped with a barbecue grill made of wire mesh, so it can offer an ordinary baking function only and has single barbecuing function.

SUMMARY OF THE INVENTION

An objective of the invention is to provide a barbecue grill, which aims at solving the main technical problems that: burners in a traditional gas-type barbecue grill, which serve to air supply and fire jet, have a high possibility of being polluted or even blocked off by oil that drips during barbecuing, thus normal functioning of the barbecue grill is affected, furthermore, the traditional barbecue grill is single in function and free from diversified barbecuing functions.

To solve the technical problems discussed above, adopted in the invention is the technical scheme below:

The invention is to provide a barbecue grill, including:

A body, the body being provided with an oven cover and a concave-arc-shaped oven chamber, the oven cover being openable and closable on a opening of the oven chamber, an oil discharge port being arranged on the lowest center part of the concave-arc-shaped bottom of the oven chamber, a plurality of keys being arranged near the opening on the inner sidewall of the oven chamber in such a manner of being orderly distributed along the edge of the opening, the plurality of keys being located on the same horizontal;

A barbecue plate being arranged in the body and embedded in the opening of the oven chamber, the edge of the barbecue plate resting on the plurality of keys, at least one burner being further arranged in the body, the burner being located below the barbecue plate, the burner being provided with a plurality of flame jet holes corresponding to the barbecue plate, wherein the barbecue plate comprises a plate-shaped barbecue plate, a mesh-shaped barbecue board, a pan holder for pan support and a grilling pan, which are all interchangeable;

A support, the body being mounted in the support; and

A platform frame, the support being erected on the platform frame, the platform frame comprising an oven platform and a stand, the stand being mounted at the bottom of the oven platform, the support being erected on the oven platform, and the oven platform being provided with grooves for placement of the barbecue plate.

Three burners are arranged in parallel in the oven chamber of the body, the barbecue plate is divided into three sections that are mutually spliced and are corresponding to the three burners respectively, i.e. a middle barbecue plate and two side barbecue plates spliced at the two sides of the middle barbecue plate, wherein one of the two side barbecue plates is mesh-shaped while the other is board-surface-shaped, the middle barbecue plate comprises a plate-shaped barbecue plate, a mesh-shaped barbecue board, a pan holder for pan support and a grilling pan that are all interchangeable, the grooves on the oven platform include a middle embedment groove for placement of the middle barbecue plate and side grooves for placement of the two side barbecue plates, the projections of the side grooves on the horizontal with respect to the middle embedment groove cross each other, the side grooves are located above the middle embedment groove, pickup grooves are arranged on the parts of the side grooves that overlap the sidewall of the middle embedment groove, the middle barbecue plate and the two side barbecue plates of the barbecue plate are embedded in the middle embedment groove and the side grooves respectively, and the plate-shaped barbecue plate, the mesh-shaped barbecue board, the pan holder and the grilling pan can be embedded in the middle embedment groove from top to bottom in an orderly overlapping manner.

Flame observation holes are arranged on the side edges of the board-surface-shaped side barbecue plate, the plate-shaped barbecue plate and the grilling pan near the inner sidewall of the oven chamber, oil drip curtain boards are arranged above the locations of the mesh-shaped side barbecue plate and the mesh-shaped barbecue board in correspondence to the respective flame jet holes, grooves or clamping keys are arranged on the side edge of the middle barbecue plate spliced with the two side barbecue plates, matching grooves or clamping keys, which are corresponding to the grooves or the clamping keys on the side edge of the middle barbecue plate, are arranged on the side edges of the two side barbecue plates spliced with the middle barbecue plate, and a holding groove is at least arranged on the side edges of the middle barbecue plate and the two side barbecue plates in correspondence to the inner sidewall of the oven chamber.

An erected frame is further arranged on the pan holder, the erected frame is a planar framework provided with more than three erected legs, a removable grid frame is further arranged in the grilling pan, and the grid frame is provided with more than three support legs that are all supported at the bottom of the grilling pan.

The support comprises a front frame and a rear frame in structural symmetry, at least two connection ribs are arranged between the front frame and the rear frame, two ends of each of the connection ribs are fixedly connected to the front frame and the rear frame respectively, a fixed framework, i.e. the support, is formed by connection of the front frame, the rear frame and the connection ribs, the body is fixedly erected among the front frame, the rear frame and the connection ribs, support arms and support legs corresponding to each other are arranged on both the front frame and the rear frame, and a shelf is further arranged between the support arms of the front frame and the rear frame.

An oil receiving tray for receiving waste oil is arranged below the body in correspondence to the oil discharge port, an oil tray frame is arranged between the oil receiving tray and the body, the oil tray frame is fixed on the body and located on the oil discharge port, a clamping groove is arranged on the oil tray frame, the opening of the oil receiving tray is provided with a connection plate, and the connection plate is detachably clamped in the clamping groove.

An airing frame is further arranged in the opening of the oven chamber and is provided with a frame ring, the frame ring is matched in contour with the opening of the oven chamber, the frame ring can be erected on the keys on the inner sidewall of the oven chamber or on the barbecue plate.

A plurality of Slots are defined on the oven platform in one-to-one correspondence to support legs of the support, a perforation penetrating through the wall of the support groove is arranged on the support groove, a positioning pin shaft is arranged in the perforation, one end of the positioning pin shaft is located in the support groove while the other end is located at the outer side of the oven platform, the positioning pin shaft is capable of axial movement in the perforation, an axial reset spring is arranged between the positioning pin shaft and the perforation, a pull ring is arranged at one end of the positioning pin shaft that is located at the outer side of the oven platform, the support legs of the support are fixed inserted into the slots, and a clamping hole for inserted clamping of the positioning pin shaft is arranged on the support leg in axial correspondence to the positioning pin shaft.

The stand comprises four support legs mounted at the bottom of the oven platform, two of the support legs located at one side are each provided with a roller wheel, the other two support legs located at the other side are each provided with a universal roller wheel, brake pedals are arranged on the two universal roller wheels respectively, and a storage box for accommodating items is erected among the four support legs.

The shelf is in a shape of isosceles trapezoid, symmetrical clamping keys are extended on the isosceles-trapezoid-shaped shelf towards two sides along the top edge, the two symmetrical clamping keys are connected to the support arms of the front frame and the rear frame respectively, support blocks are arranged on the support arms of the front frame and the rear frame in a manner of protruding in opposite directions, the shelf rests on the support blocks, reinforcing ribs are arranged on the back of the shelf along the edge, the height of the reinforcing ribs gradually increases from the top edge to the bottom edge of the isosceles-trapezoid-shaped shelf, vertical chutes are correspondingly arranged on the opposite faces of the support arms of the front frame and the rear frame, the chute penetrates through the support arm in a vertical direction, the width of the chute is within a range from the maximal height to the minimal height of the reinforcing rib, a horizontal clamping groove matched with the clamping key is arranged on the side edge of the chute in correspondence to one side of the body, and the width of the clamping key is smaller than that of the chute.

Compared with the prior art, the invention has the beneficial effects below:

1. Diversified barbecuing is realized by the plate-shaped barbecue plate, the mesh-shaped barbecue board, the pan holder and the grilling pan in the barbecue plate that are interchangeable;

2. By virtue of the concave-arc-shaped wall of the inner chamber of the body, waste oil automatically flows to the oil receiving tray at the oil discharge port located at the lowest center part, thus facilitating cleaning of the waste oil;

3. With the help of the classified grooves on the oven platform, the barbecue plates can be stored and used conveniently;

4. The oil drip curtain boards are arranged on the mesh-shaped barbecue board in correspondence to the flame jet holes of the burners, which prevents food wastes and waste oil from falling into the flame jet holes during barbecuing so as to result in blockage of the flame jet holes and to affect normal flame jet.

DETAILED DESCRIPTION OF THE DRAWINGS

Figure 1:
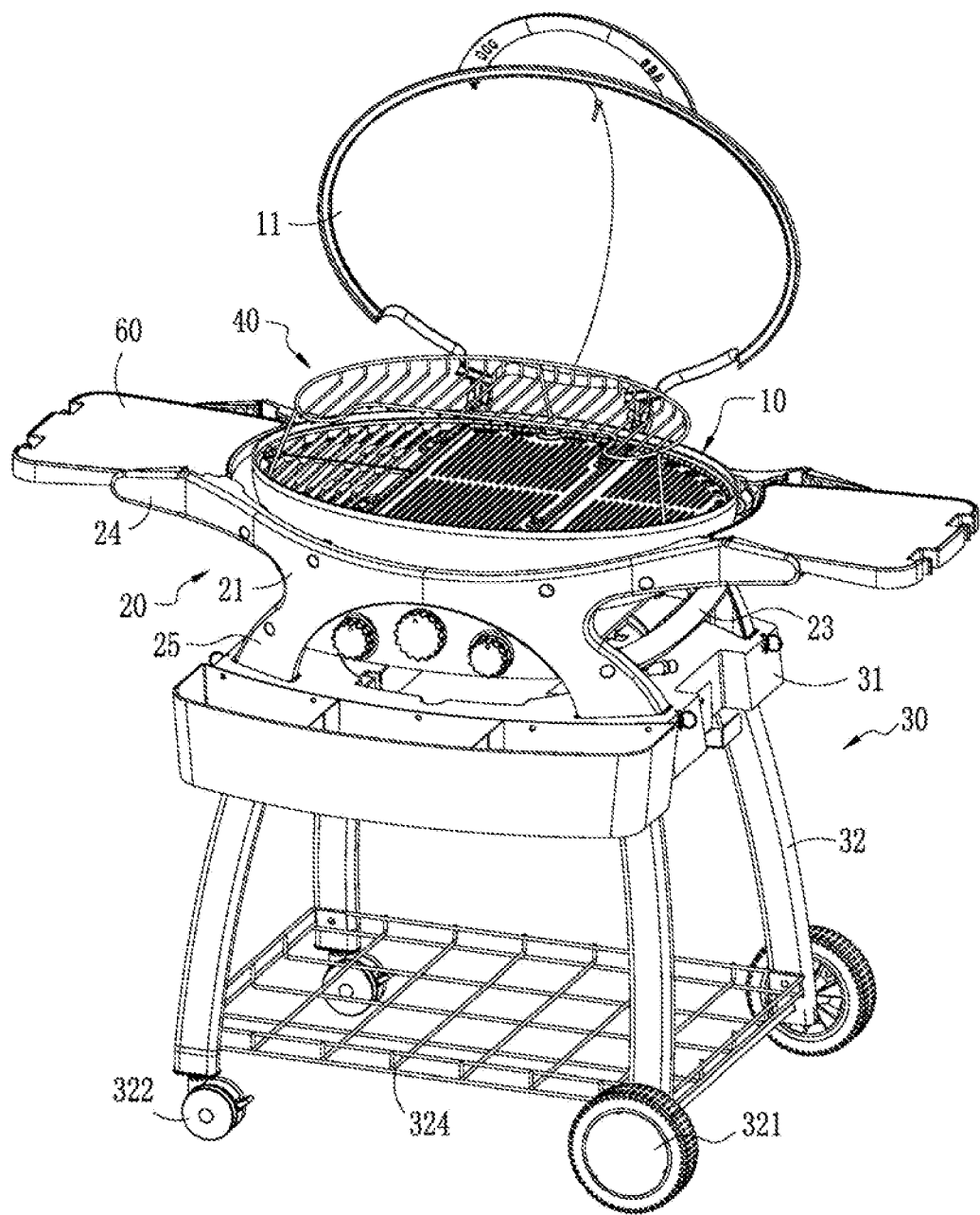
FIG. 1 is an assembled view of a barbecue grill of an exemplary embodiment of the disclosure.

With reference to FIG. 1 to FIG. 10 and the preferred embodiments, further detailed description will be made below to the combined multifunctional barbecue grill proposed in the invention.

As shown in FIG. 1 to FIG. 10, the invention provides a combined multifunctional barbecue grill, which comprises a body 10, a support 20 and a platform frame 30, the body 10 is mounted in the support 20, the support 20 is erected on the platform frame 30, wherein the body 10 is provided with an oven cover 11 and a concave-arc-shaped oven chamber 12, the oven cover 11 is openable and closable on a opening of the oven chamber 12, an oil discharge port 13 is arranged on the lowest center part of the concave-arc-shaped bottom of the oven chamber 12, waste oil automatically flows to the oil discharge port 13 at the lowest center part by virtue of the concave-arc-shaped wall of the inner chamber of the body 10, a plurality of keys 121 are arranged near the opening on the inner sidewall of the oven chamber 12 in such a manner of being orderly distributed along the edge of the opening, the plurality of keys 121 are located on the same horizontal, a barbecue plate 40 is arranged in the body 10, the barbecue plate 40 is embedded in the opening of the oven chamber 12, the edge of the barbecue plate 40 rests on the plurality of keys 121 so that the barbecue plate 40 can be replaced conveniently, at least one burner 50 is further arranged in the body 10, the burner 50 is located below the barbecue plate 40, the burner 50 is provided with a plurality of flame jet holes 51 corresponding to the barbecue plate 40, the support 20 comprises a front frame 21 and a rear frame 22 in structural symmetry, at least two connection ribs 23 are arranged between the front frame 21 and the rear frame 22, two ends of each of the connection ribs 23 are fixedly connected to the front frame 21 and the rear frame 22 respectively, a fixed framework, i.e. the support 20, is formed by connection of the front frame 21, the rear frame 22 and the connection ribs 23, the body 10 is fixedly erected among the front frame 21, the rear frame 22 and the connection ribs 23, support arms 24 and support legs 25 corresponding to each other are arranged on both the front frame 21 and the rear frame 22, a shelf 60 is further arranged between the support arms 24 of the front frame 21 and the rear frame 22, the body 10 is erected by the support 20, barbecue spices, food, tools and the like are put on the shelf 60, the platform frame 30 comprises an oven platform 31 and a stand, the stand is mounted at the bottom of the oven platform 31, the support 20 is erected on the oven platform 31, the oven platform 31 is provided with grooves for placement of the barbecue plate 40, and slots 33 are arranged on the oven platform 31 in one-to-one correspondence to support legs 25 of the support 20.

Embodiment 1: as shown in FIG. 2, FIG. 4, FIG. 5, FIG. 6 and FIG. 8, three burners 50 are arranged in parallel in the oven chamber 12 of the body 10, the barbecue plate 40 comprises a middle barbecue plate and two side barbecue plates spliced at the two sides of the middle barbecue plate, which are corresponding to the three burners 50 respectively, wherein one of the two side barbecue plates is mesh-shaped while the other is board-surface-shaped, as shown in FIG. 1, FIG. 2, FIG. 4, FIG. 5 and FIG. 6, the side barbecue plate 41 located at the left side is mesh-shaped and the side barbecue plate 42 located at the right side is board-surface-shaped, the middle barbecue plate comprises a plate-shaped barbecue plate 43, a mesh-shaped barbecue board 44, a pan holder 45 for pan support and a grilling pan 46 that are all interchangeable, the plate-shaped barbecue plate 43 can be used for Pizza frying, teppanyaki and the like, the mesh-shaped barbecue board 44 can be used for food barbecuing in the traditional barbecue method, the pan holder 45 can be used for carrying a pan or a kettle for cooking or water heating, the grilling pan 46 can be directly used for oil-flying or grilling food with large three-dimensional size, e.g. grilling chickens, flame observation holes 47 are arranged on the side edges of the board-surface-shaped side barbecue plate (the side barbecue plate 42 at the right side as shown in FIG. 2, FIG. 4, FIG. 5 and FIG. 6), the plate-shaped barbecue plate 43 and the grilling pan 46 near the inner sidewall of the oven chamber 12, thus whether the burners 50 are ignited normally can be observed and accumulated waste oil can also be discharged, oil drip curtain boards 48 are arranged above the locations of the mesh-shaped side barbecue plate (the side barbecue plate 41 at the left side as shown in FIG. 2, FIG. 4, FIG. 5 and FIG. 6) and the mesh-shaped barbecue board 44 in correspondence to the respective flame jet holes 51, grooves 1 or clamping keys 2 are arranged on the side edge of the middle barbecue plate spliced with the two side barbecue plates, matching clamping keys 2 or grooves 1, which are corresponding to the grooves 1 or the clamping keys 2 on the side edge of the middle barbecue plate, are arranged on the side edges of the two side barbecue plates spliced with the middle barbecue plate, as shown in FIG. 2, FIG. 4, FIG. 5 and FIG. 6, the grooves 1 are arranged on the side edges of the plate-shaped barbecue plate 43, the mesh-shaped barbecue board 44, the pan holder 45 for pan support and the grilling pan 46 spliced with the side barbecue plates at the two sides, the clamping keys 2 are arranged on the side barbecue plate 41 at the left side and the side barbecue plate 42 at the right side in correspondence to the grooves 1, the clamping keys 2 are clamped in the grooves 1, a holding groove 3 is at least arranged on the side edges of the middle barbecue plate and the two side barbecue plates in correspondence to the inner sidewall of the oven chamber 12, thus, a user can put fingers or other tools through the holding grooves 3 so as to take the middle barbecue plate and the two side barbecue plates out of the opening of the oven chamber 12.

Figure 5:
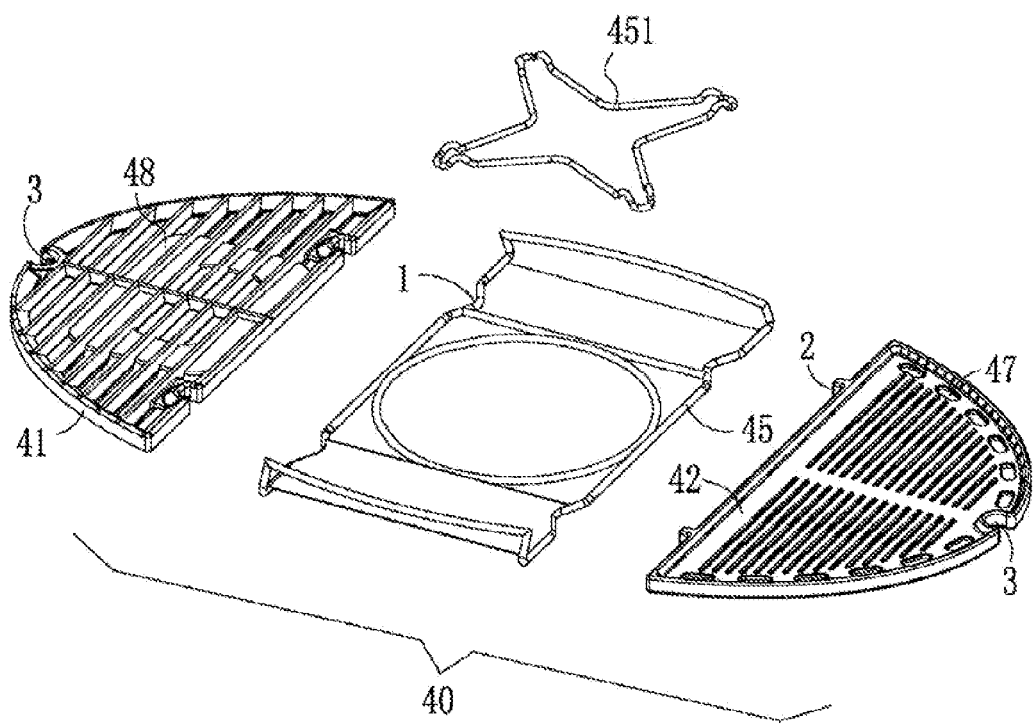
FIG. 5 is a schematic diagram illustrating an embodiment of the invention, in which a barbecue plate includes a pan holder.

Embodiment 2: an erected frame 451 is further arranged on the pan holder 45, the erected frame 451 is a planar framework provided with more than three erected legs (as shown in FIG. 5, the erected frame 451 is provided with four erected legs and is in a shape of cruciform framework), and the pan holder 45, in combination with the erected frame 451, is capable of carrying a smaller pan or a smaller cup.

Figure 6:
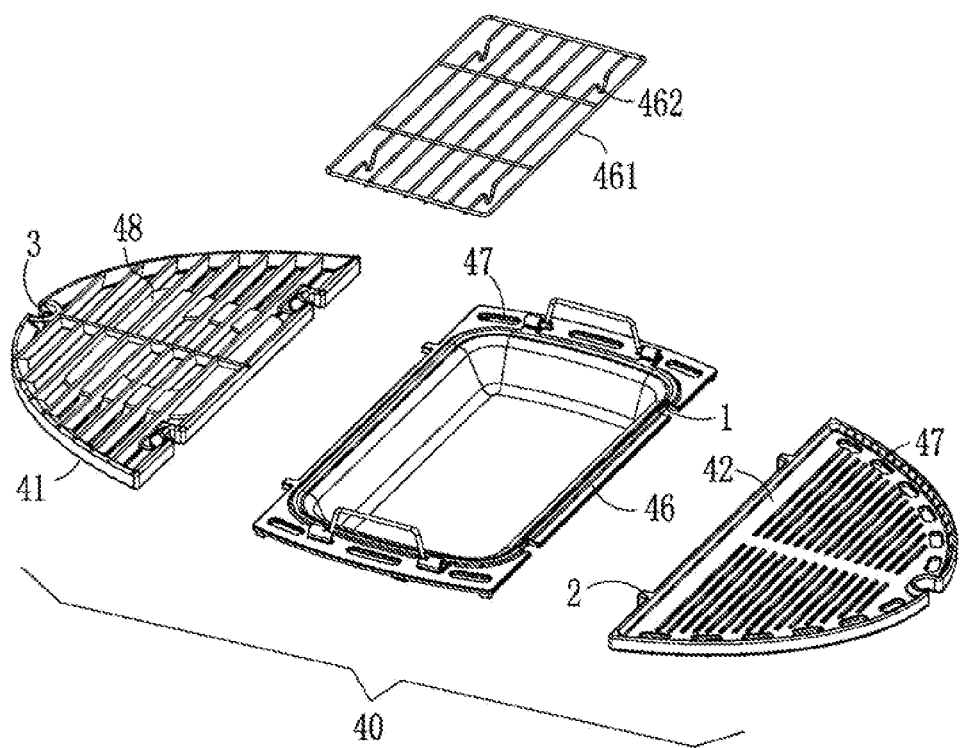
FIG. 6 is a schematic diagram illustrating an embodiment of the invention, in which the barbecue plate comprises a grilling pan.

Embodiment 3: a removable grid frame 461 is further arranged in the grilling pan 46, and the grid frame 461 is provided with more than three support legs 462 (as shown in FIG. 6, there are four support legs 462) that are all supported at the bottom of the grilling pan 46, and food burning and pan sticking can be effectively prevented by separating the food in the grilling pan 46 from the pan bottom via the grid frame 461.

Figure 7:
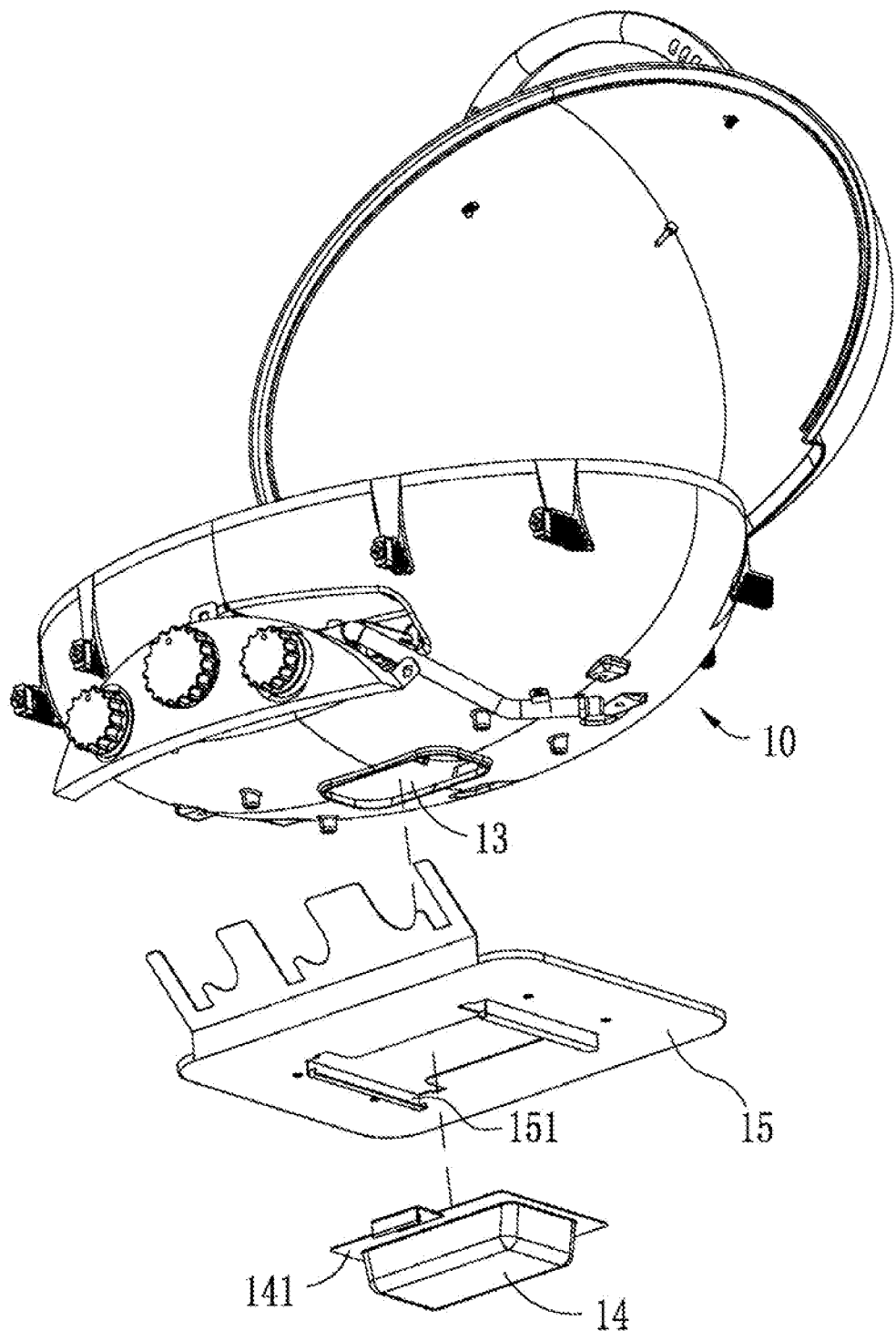
FIG. 7 is a schematic diagram illustrating the embodiment of the mounting structure of the oil receiving tray of the invention.
Figure 8:
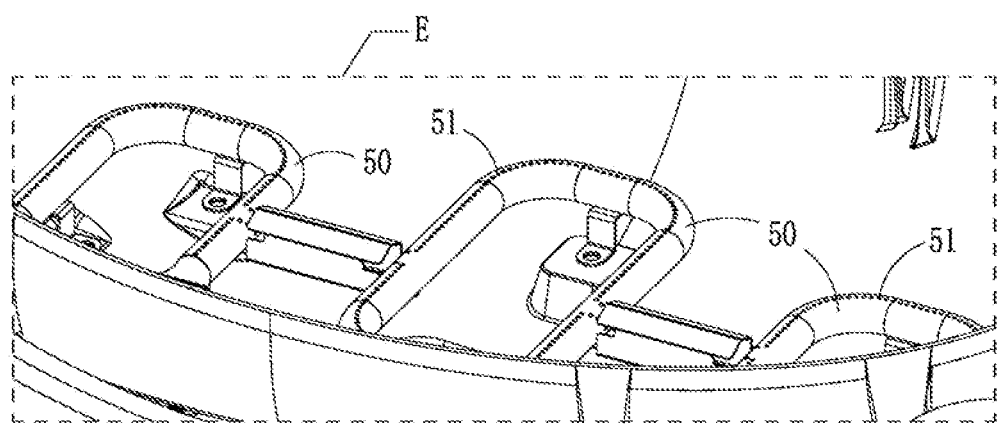
FIG. 8 is a partially enlarged diagram of E in FIG. 4.

Embodiment 4: as shown in FIG. 7, an oil receiving tray 14 for receiving waste oil is arranged below the body 10 in correspondence to the oil discharge port 13, an oil tray frame 15 is arranged between the oil receiving tray 14 and the body 10, the oil tray frame 15 is fixed on the body 10 and located on the oil discharge port 13, a clamping groove 151 is arranged on the oil tray frame 15, the opening of the oil receiving tray 14 is provided with a connection plate 141, the connection plate 141 is detachably clamped in the clamping groove 151, and the connection plate 141 on the oil receiving tray 14 can be taken out of the clamping groove 151 so as to facilitate cleaning of the waste oil in the oil receiving tray 14.

Figure 2:
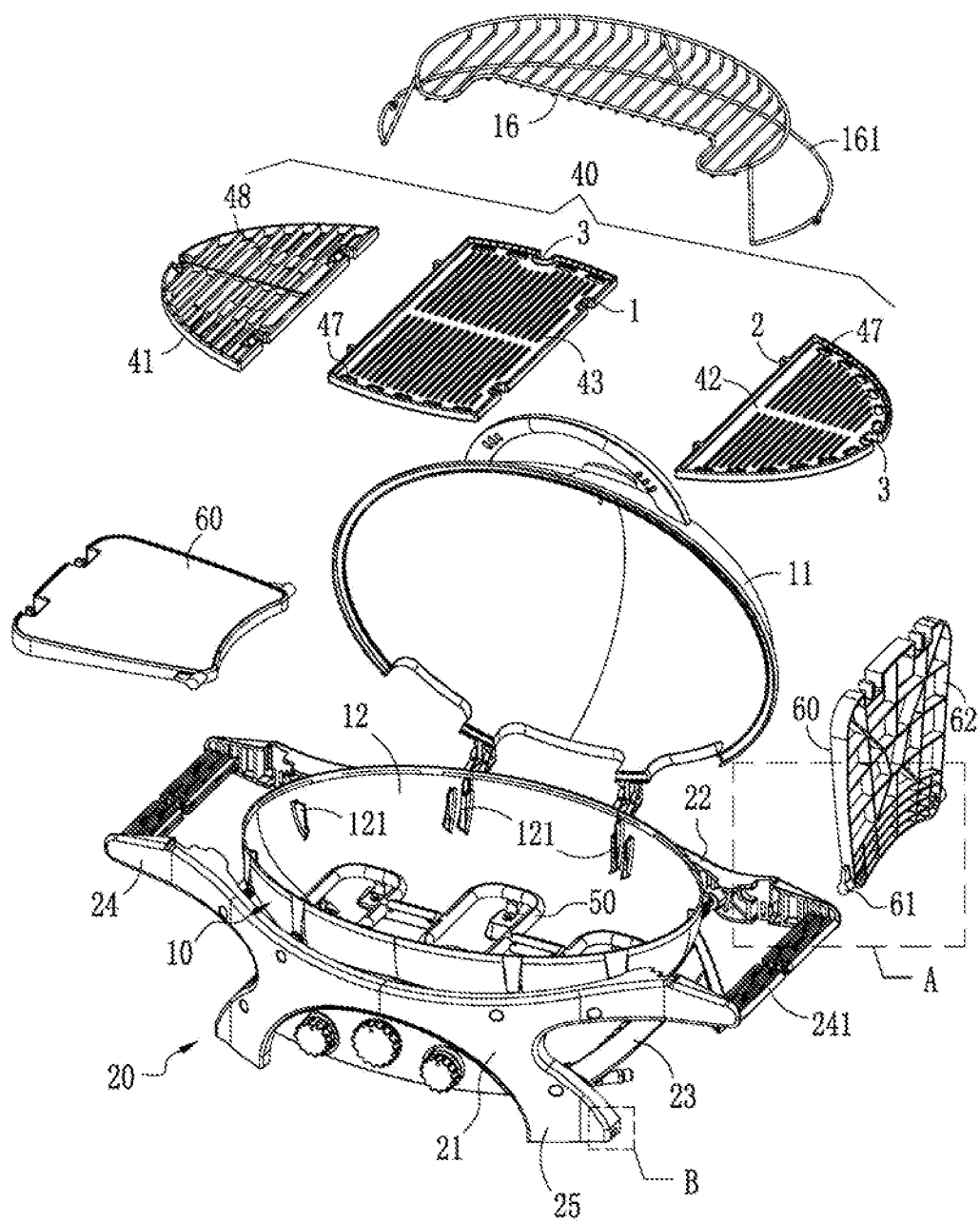
FIG. 2 is an exploded stereogram of a body and a support of the invention.

Embodiment 5: as shown in FIG. 2, an airing frame 16 is further arranged in the opening of the oven chamber 12 and is provided with a frame ring 161, the frame ring 151 is matched in contour with the opening of the oven chamber 12, the frame ring 161 can be erected on the keys 121 on the inner sidewall of the oven chamber 12 or on the barbecue plate 40, and during specific implementation of this embodiment, the airing frame 16 can be erected on the barbecue plate 40 and the properly-barbecued food is put on the airing frame 16 for the purpose of airing, so the food can be prevented from getting cold and being burnt at the same time by means of the heat from the barbecue grill.

Figure 3:
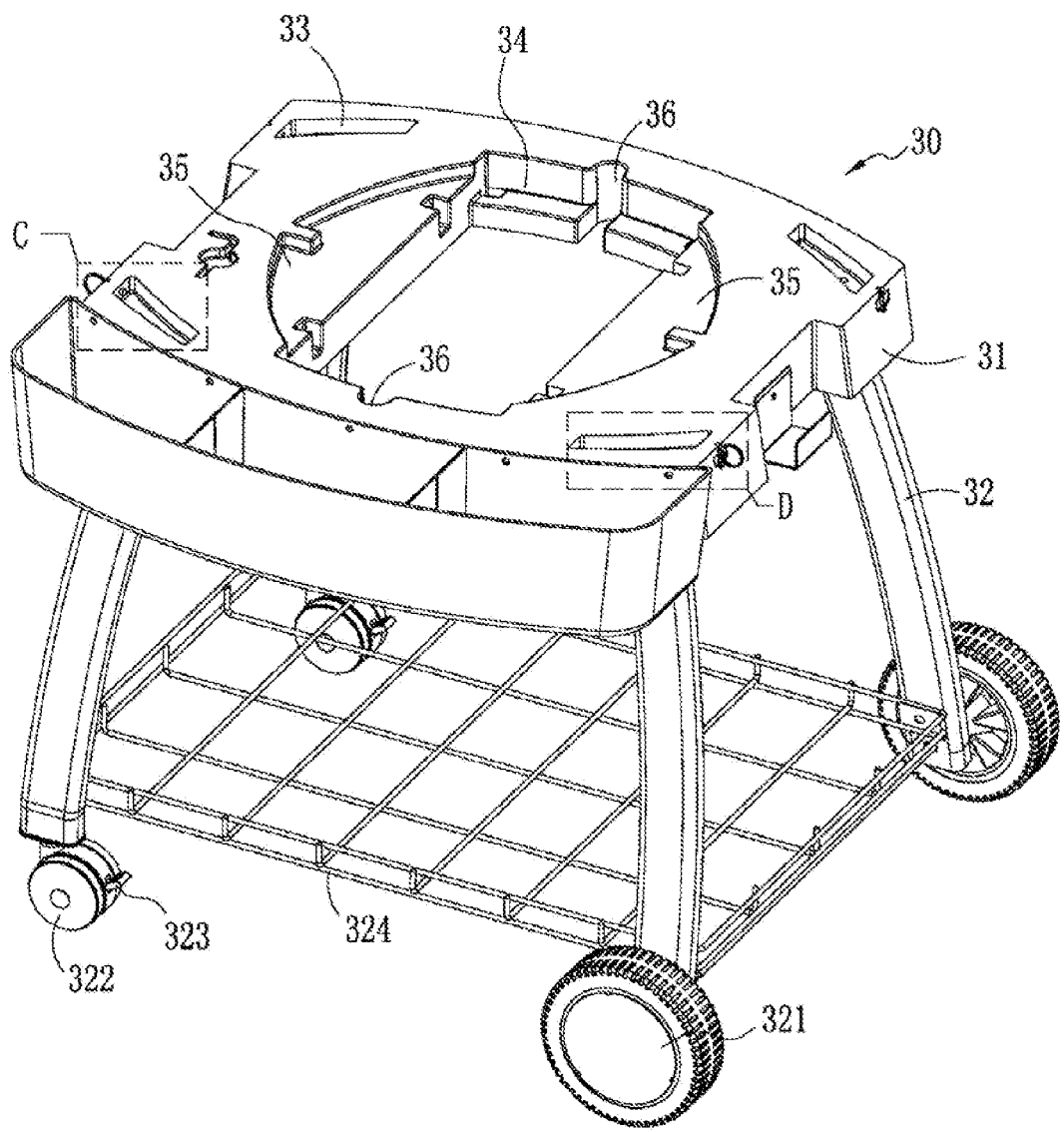
FIG. 3 is a structural stereogram of a platform frame of the invention.
Figure 4:
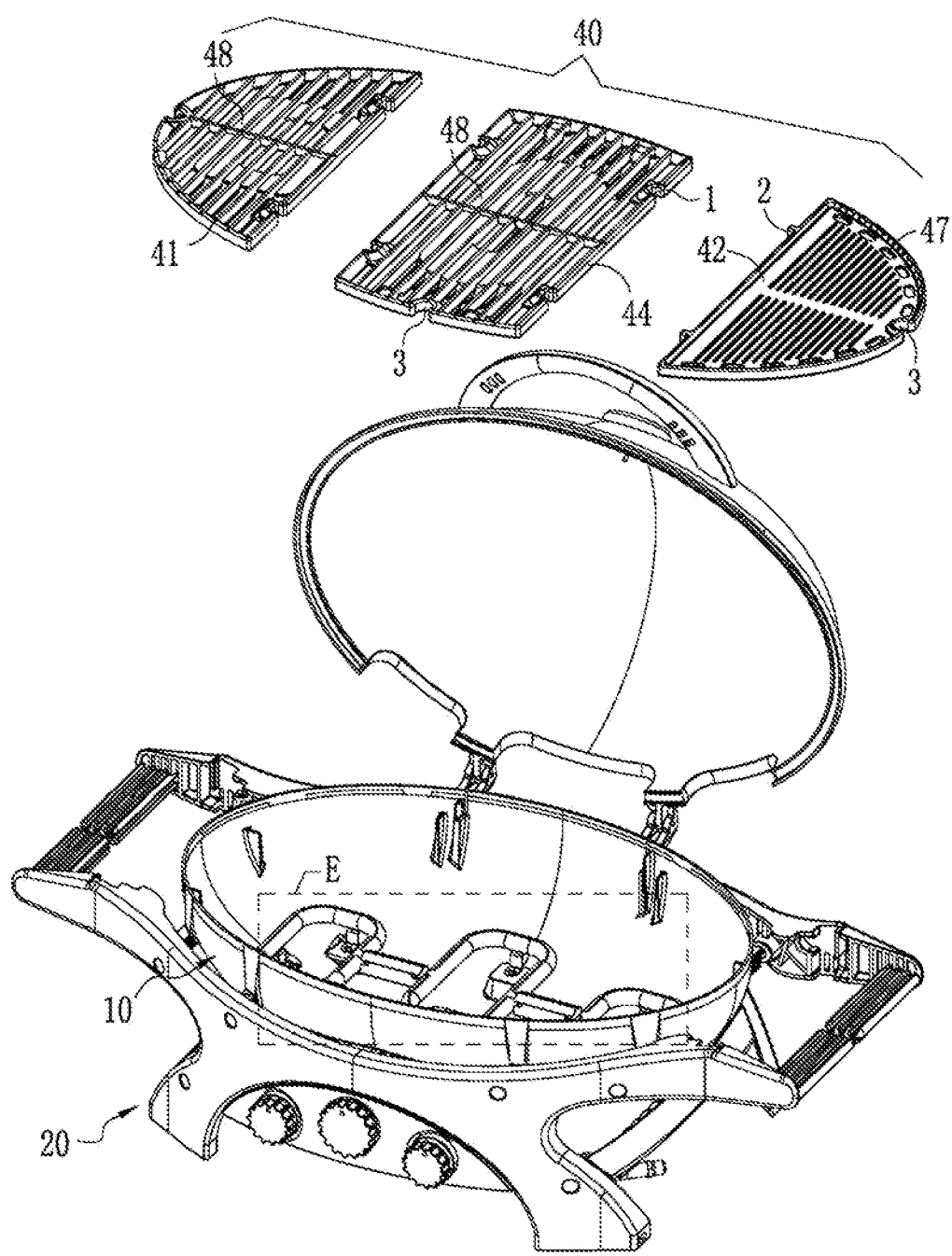
FIG. 4 is an exploded structural diagram of the body and the support in another embodiment of the invention.

Embodiment 6: as shown in FIG. 3, the grooves on the oven platform 31 include a middle embedment groove 34 for placement of the middle barbecue plate and side grooves 35 for placement of the two side barbecue plates, the projections of the side grooves 35 on the horizontal with respect to the middle embedment groove 34 cross each other, the side grooves 35 are located above the middle embedment groove 34, pickup grooves 36 are arranged on the parts of the side grooves that overlap the sidewalls of the middle embedment groove 34, the middle barbecue plate and the two side barbecue plates of the barbecue plate 40 are embedded in the middle embedment groove 34 and the side grooves 35 respectively, the plate-shaped barbecue plate 43, the mesh-shaped barbecue board 44, the pan holder 45 for pan support and the grilling pan 46 can be embedded in the middle embedment groove 34 from top to bottom in an orderly overlapping manner, such a layered and classified overlapping arrangement can save space effectively and facilitate selection for the desired barbecue tools in the barbecue plate 40, furthermore, a user can put fingers or other tools through the pickup grooves 36 so as to take out the middle barbecue plate and the two side barbecue plates.

Figure 9:
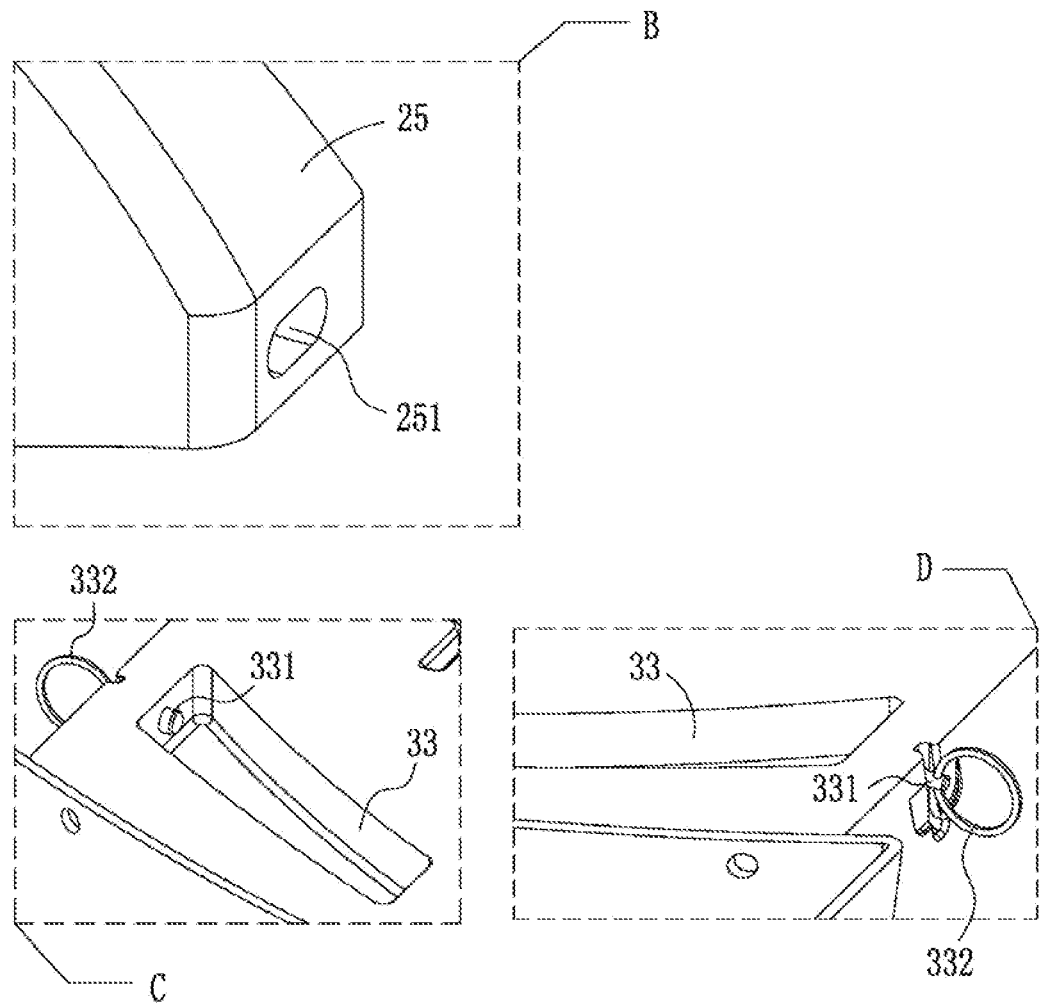
FIG. 9 is a partially enlarged diagram of B, C and D in FIG. 2 and FIG. 3.

Embodiment 7: as shown in FIG. 3 and FIG. 9, a perforation penetrating through the wall of the support groove is arranged on the support groove 33, a positioning pin shaft 331 is arranged in the perforation, one end of the positioning pin shaft 331 is located in the support groove 33 while the other end is located at the outer side of the oven platform 31, the positioning pin shaft 331 is capable of axial movement in the perforation, an axial reset spring is arranged between the positioning pin shaft 331 and the perforation, a pull ring 332 is arranged at one end of the positioning pin shaft 331 that is located at the outer side of the oven platform 31, the support legs 25 of the support 20 are fixed inserted into the slots 33, a clamping hole 251 for inserted clamping of the positioning pin shaft 331 is arranged on the support leg 25 in correspondence to the positioning pin shaft 331; during specific implementation of this embodiment, the pull ring 332 is pulled outwards so that one end of the positioning pin shaft 331, located in the support groove 33, returns into the wall of the support groove 33, the support leg 25 is inserted into the support groove 33, and then, the pull ring 332 is released, the positioning pin shaft 331 protrudes out of the wall of the support groove 33 again under the action of the axial reset spring and is then inserted into the clamping hole 251 of the support leg 25, as a result, the support leg 25 is fixedly inserted into the support groove 33.

Embodiment 8: as shown in FIG. 3, the stand comprises four support legs 32 mounted at the bottom of the oven platform 31, two of the support legs 32 located at one side are each provided with a roller wheel 321, the other two support legs 32 located at the other side are each provided with a universal roller wheel 322, brake pedals 323 are arranged on the two universal roller wheels 322 respectively, a storage box 324 for accommodating items is erected among the four support legs 32; during specific implementation of this embodiment, movement is readily achieved by these four wheels, turning is conveniently achieved by these two universal roller wheels, and the storage box is capable of preventing the items accommodated therein from falling.

Figure 10:
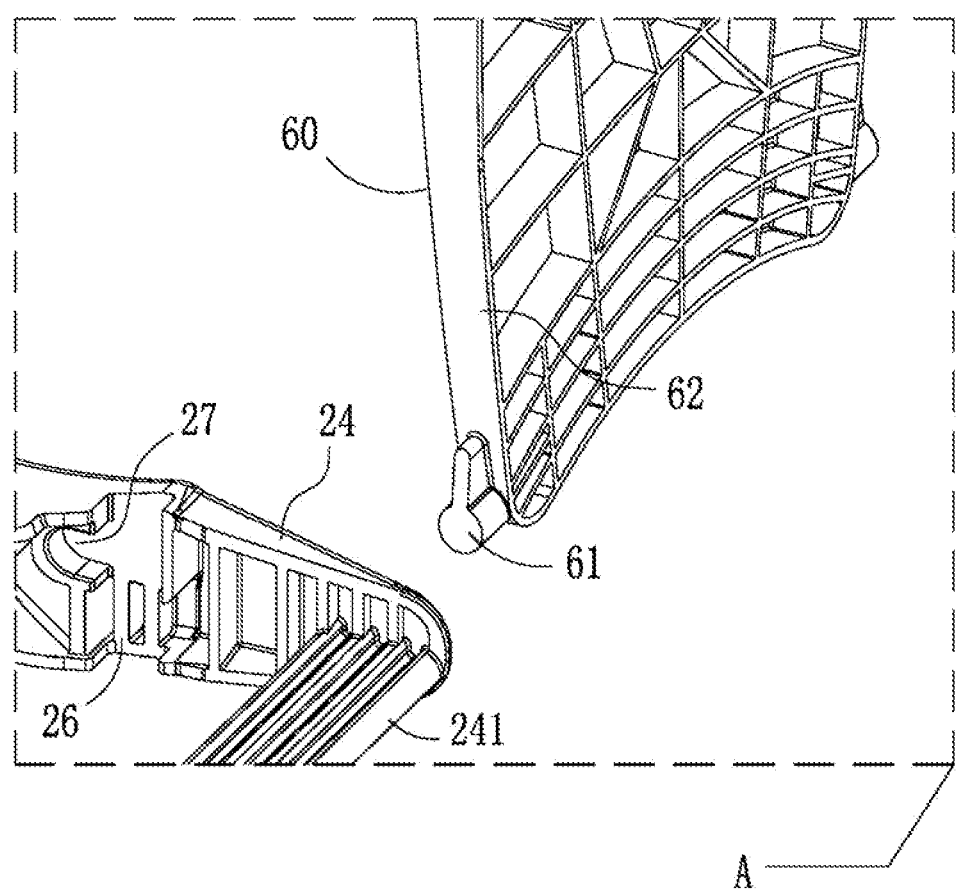
FIG. 10 is a partially enlarged diagram of A in FIG. 2.

Embodiment 9: as shown in FIG. 2 and FIG. 10, the shelf 60 is in a shape of isosceles trapezoid, symmetrical clamping keys 61 are extended on the isosceles-trapezoid-shaped shelf 60 towards two sides along the top edge, the two symmetrical clamping keys 61 are connected to the support arms 24 of the front frame 21 and the rear frame 22 respectively, support blocks 241 are arranged on the support arms 24 of the front frame 21 and the rear frame 22 in a manner of protruding in opposite directions, the shelf 60 rests on the support blocks 241, reinforcing ribs 62 are arranged on the back of the shelf 60 along the edge, the height of the reinforcing ribs 62 gradually increases from the top edge to the bottom edge of the isosceles-trapezoid-shaped shelf 60, vertical chutes 26 are correspondingly arranged on the opposite faces of the support arms 24 of the front frame 21 and the rear frame 22, the chute 26 penetrates through the support arm 24 in a vertical direction, the width of the chute 26 is within a range from the maximal height to the minimal height of the reinforcing rib 62, a horizontal clamping groove 27 matched with the clamping key 61 is arranged on the side edge of the chute in correspondence to one side of the body 10, the width of the clamping key 61 is smaller than that of the chute 26, and the clamping key 61 is capable of circumferential rotation in the vertical chute 26; during specific implementation of this embodiment, the clamping keys 61 of the shelf 60 can be inserted into the horizontal clamping grooves 27 through the vertical chutes 26, the other end of the shelf 60 in correspondence to the clamping key 61 rests on the support block 241, in case that the shelf 60 needs to be folded, the shelf 60 is moved horizontally and outwardly so that the clamping keys 61 retreat from the horizontal clamping grooves 27 and enter into the vertical chutes 26, the shelf 60 is flipped over by taking the clamping keys 61 as rotating shafts and then inserted into the chutes 26, and due to the trapezoidal shape of the shelf 60 and gradual increase of the height of the reinforcing ribs 62 from the top edge to the bottom edge of the trapezoid, the shelf 60 will be clamped in the vertical chutes 26 to further realize folding of the shelf 60.

The embodiments discussed above are for comprehension of the invention only, not limitations thereto, many variations or modifications could also be made by those ordinary skilled in this art on the basis of the technical proposal of claims, and these variations or modifications shall be contemplated as being within the scope of the invention.

The invention claimed is:

1. A barbecue grill comprising: a body being provided with an oven cover and a concave-arc-shaped oven chamber, the oven cover being openable and closable on an opening of the oven chamber, an oil discharge port being arranged on the lowest center part of the concave-arc-shaped bottom of the oven chamber, a plurality of keys being arranged near the opening on the inner sidewall of the oven chamber in such a manner of being orderly distributed along the edge of the opening, the plurality of keys being located on the same horizontal; a barbecue plate being arranged in the body and embedded in the opening of the oven chamber, the edge of the barbecue plate resting on the plurality of keys, at least one burner being further arranged in the body, the burner being located below the barbecue plate, the burner being provided with a plurality of flame jet holes corresponding to the barbecue plate, wherein the barbecue plate comprises a plate-shaped barbecue plate, a mesh-shaped barbecue board, a pan holder for pan support and a grilling pan, which are all interchangeable; a support, the body being mounted in the support; and a platform frame, the support being erected on the platform frame, the platform frame comprising an oven platform and a stand, the stand being mounted at the bottom of the oven platform, the support being erected on the oven platform, and the oven platform defining a plurality of grooves for placement of the barbecue plate; wherein three burners are arranged in parallel in the oven chamber of the body, the barbecue plate is divided into three sections that are mutually spliced and are corresponding to the three burners respectively, i.e. a middle barbecue plate and two side barbecue plates spliced at the two sides of the middle barbecue plate, wherein one of the two side barbecue plates is mesh-shaped while the other is board-surface-shaped, the middle barbecue plate comprises a plate-shaped barbecue plate, a mesh-shaped barbecue board, a pan holder for pan support and a grilling pan that are all interchangeable, the grooves on the oven platform comprises a middle embedment groove for placement of the middle barbecue plate and side grooves for placement of the two side barbecue plates, the projections of the side grooves on the horizontal with respect to the middle embedment groove cross each other, the side grooves are located above the middle embedment groove, pickup grooves are arranged on the parts of the side grooves that overlap the sidewall of the middle embedment groove, the middle barbecue plate and the two side barbecue plates of the barbecue plate are embedded in the middle embedment groove and the side grooves respectively, and the plate-shaped barbecue plate, the mesh-shaped barbecue board, the pan holder and the grilling pan can be embedded in the middle embedment groove from top to bottom in an orderly overlapping manner.

2. The barbecue grill of claim 1, wherein flame observation holes are defined on the side edges of the board-surface-shaped side barbecue plate, the plate-shaped barbecue plate and the grilling pan near the inner sidewall of the oven chamber, oil drip curtain boards are arranged above the locations of the mesh-shaped side barbecue plate and the mesh-shaped barbecue board in correspondence to the respective flame jet holes, grooves or clamping keys are arranged on the side edge of the middle barbecue plate spliced with the two side barbecue plates, matching grooves or clamping keys, which are corresponding to the grooves or the clamping keys on the side edge of the middle barbecue plate, are arranged on the side edges of the two side barbecue plates spliced with the middle barbecue plate, and a holding groove is at least arranged on the side edges of the middle barbecue plate and the two side barbecue plates in correspondence to the inner sidewall of the oven chamber.

3. The barbecue grill of claim 2, wherein an erected frame is further arranged on the pan holder, the erected frame is a planar framework provided with more than three erected legs, a removable grid frame is further arranged in the grilling pan, and the grid frame is provided with more than three support legs that are all supported at the bottom of the grilling pan.

4. The barbecue grill of claim 3, wherein the support comprises a front frame and a rear frame in structural symmetry, at least two connection ribs are arranged between the front frame and the rear frame, two ends of each of the connection ribs are fixedly connected to the front frame and the rear frame respectively, a fixed framework, i.e. the support, is formed by connection of the front frame, the rear frame and the connection ribs, the body is fixedly erected among the front frame, the rear frame and the connection ribs, support arms and support legs corresponding to each other are arranged on both the front frame and the rear frame, and a shelf is further arranged between the support arms of the front frame and the rear frame.

5. The barbecue grill of claim 4, wherein an oil receiving tray' for receiving waste oil is arranged below the body in correspondence to the oil discharge port, an oil tray frame is arranged between the oil receiving tray and the body, the oil tray frame is fixed on the body and located on the oil discharge port, a clamping groove is arranged on the oil tray frame, the opening of the oil receiving tray is provided with a connection plate, and the connection plate is detachably clamped in the clamping groove.

6. The barbecue grill of claim 5, wherein an airing frame is further arranged in the opening of the oven chamber and is provided with a frame ring, the frame ring is matched in contour with the opening of the oven chamber, the frame ring can be erected on the keys on the inner sidewall of the oven chamber or on the barbecue plate.

7. The barbecue grill of claim 6, wherein A slot is defined on the oven platform in one-to-one correspondence to support legs of the support, a perforation penetrating through the wall of the support groove is arranged on the support goove, a positioning pin shaft is arranged in the perforation, one end of the positioning pin shaft is located in the support groove while the other end is located at the outer side of the oven platform, the positioning pin shaft is capable of axial movement in the perforation, an axial reset spring is arranged between the positioning pin shaft and the perforation, a pull ring is arranged at one end of the positioning pin shaft that is located at the outer side of the oven platform, the support legs of the support are fixed inserted into the slot grooves, and a clamping hole for inserted clamping of the positioning pin shaft is arranged on the support leg in axial correspondence to the positioning pin shaft.

8. The barbecue grill of claim 7, wherein the stand comprises four support legs mounted at the bottom of the oven platform, two of the support legs located at one, side are each provided with a roller wheel, the other two support legs located at the other side are each provided with a universal roller wheel, brake pedals are arranged on the two universal roller wheels respectively, and a storage box for accommodating items is erected among the four support legs.

9. The barbecue grill of claim 8, wherein the shelf is in a shape of isosceles trapezoid, symmetrical clamping keys are extended on the isosceles-trapezoid-shaped shelf towards two sides along the top edge, the two symmetrical clamping keys are connected to the support arms of the front frame and the rear frame respectively, support blocks are arranged on the support arms of the front frame and the rear frame in a manner of protruding in opposite directions, the shelf rests on the support blocks, reinforcing ribs are arranged on the back of the shelf along the edge, the height of the reinforcing ribs gradually increases from the top edge to the bottom edge of the isosceles-trapezoid-shaped shelf, vertical chutes are correspondingly arranged on the opposite faces of the support arms of the front frame and the rear frame, the chute penetrates through the support arm in a vertical direction, the width of the chute is within a range from the maximal height to the minimal height of the reinforcing rib, a horizontal clamping groove matched with the clamping key is arranged on the side edge of the chute in correspondence to one side of the body, and the width of the clamping key is smaller than that of the chute.

\* \* \* \* \*